(12) United States Patent
Zhang et al.

(10) Patent No.: US 9,501,550 B2
(45) Date of Patent: Nov. 22, 2016

(54) OLAP QUERY PROCESSING METHOD ORIENTED TO DATABASE AND HADOOP HYBRID PLATFORM

(75) Inventors: Yan-Song Zhang, Beijing (CN); Shan Wang, Beijing (CN)

(73) Assignee: Renmin University of China, Beijing (CN)

( * ) Notice: Subject to any disclaimer, the term of this patent is extended or adjusted under 35 U.S.C. 154(b) by 1067 days.

(21) Appl. No.: 13/514,296

(22) PCT Filed: May 16, 2012

(86) PCT No.: PCT/CN2012/075622
§ 371 (c)(1),
(2), (4) Date: Jun. 7, 2012

(87) PCT Pub. No.: WO2013/155752
PCT Pub. Date: Oct. 24, 2013

(65) Prior Publication Data
US 2013/0282650 A1  Oct. 24, 2013

(30) Foreign Application Priority Data

Apr. 18, 2012  (CN) .......................... 2012 1 0114112

(51) Int. Cl.
*G06F 17/30* (2006.01)
(52) U.S. Cl.
CPC ............... *G06F 17/30592* (2013.01)
(58) Field of Classification Search
CPC .............. G06F 17/30592; G06F 17/30917; G06F 17/30545; G06F 17/30424;
(Continued)

(56) References Cited

U.S. PATENT DOCUMENTS 7,007,020 B1 *  2/2006  Chen ................. G06F 17/30539
                                                    705/7.29
7,007,029 B1 *  2/2006  Chen ......................... 707/999.1
(Continued)

FOREIGN PATENT DOCUMENTS

CN         101996250 A       3/2011

OTHER PUBLICATIONS

Abadi et al., HadoopDB: An Architectural Hybrid of MapReduce and DBMS Technologies for Analytical Workloads, ACM, Aug. 2009, pp. 1-12.*
(Continued)

*Primary Examiner* — Phuong Thao Cao
*Assistant Examiner* — Rezwanul Mahmood
(74) *Attorney, Agent, or Firm* — Osha Liang LLP

(57) ABSTRACT

An OLAP query processing method oriented to a database and Hadoop hybrid platform is described. When OLAP query processing is performed, the processing is executed first on a main working copy, and a query processing result is recorded in an aggregate result table of a local database; when a working node is faulty, node information of a fault-tolerant copy corresponding to the main working copy is searched for through namenode, and a MapReduce task is invoked to complete the OLAP query processing task on the fault-tolerant copy. The database technology and the Hadoop technology are combined, and the storage performance of the database and the high expandability and high availability of the Hadoop are combined; the database query processing and the MapReduce query processing are integrated in a loosely-coupled mode, thereby ensuring the high query processing performance, and ensuring the high fault-tolerance performance.

7 Claims, 7 Drawing Sheets

(58) Field of Classification Search
CPC .................... G06F 17/30557; G06F 17/30315; G06F 17/30412
See application file for complete search history.

(56) References Cited

U.S. PATENT DOCUMENTS

| | | | | |
|---|---|---|---|---|
| 8,732,118 | B1* | 5/2014 | Cole | G06F 17/30563 707/600 |
| 2005/0165733 | A1* | 7/2005 | Strovink | G06F 17/30457 |
| 2008/0215556 | A1* | 9/2008 | Surna | G06F 17/30424 |
| 2010/0293135 | A1* | 11/2010 | Candea | G06F 17/30442 707/602 |
| 2011/0131250 | A1* | 6/2011 | Stolte | G06F 17/30592 707/802 |
| 2011/0302583 | A1* | 12/2011 | Abadi | G06F 17/30545 718/102 |
| 2012/0109878 | A1* | 5/2012 | Debrot | G06F 17/30592 707/602 |
| 2012/0239612 | A1* | 9/2012 | George | G06F 17/30563 707/602 |
| 2012/0311581 | A1* | 12/2012 | Balmin | G06F 9/5066 718/100 |
| 2013/0013552 | A1* | 1/2013 | Eshleman | G06Q 10/00 707/600 |
| 2013/0048572 | A1* | 2/2013 | Hawks | C02F 1/66 210/747.2 |
| 2013/0166568 | A1* | 6/2013 | Binkert | G06F 17/30911 707/741 |
| 2013/0205028 | A1* | 8/2013 | Crockett | G06F 9/5027 709/226 |
| 2013/0275364 | A1* | 10/2013 | Wang | G06F 17/30592 707/602 |
| 2013/0275365 | A1* | 10/2013 | Wang | G06F 17/30592 707/602 |
| 2013/0282650 | A1* | 10/2013 | Zhang | G06F 17/30592 707/605 |
| 2013/0311454 | A1* | 11/2013 | Ezzat | G06F 17/30539 707/722 |
| 2014/0025626 | A1* | 1/2014 | Mefford | G06F 17/30864 707/603 |
| 2014/0279838 | A1* | 9/2014 | Tsirogiannis | G06F 17/30917 707/603 |
| 2014/0372438 | A1* | 12/2014 | Chandramouli | G06F 17/30598 707/737 |
| 2015/0278334 | A1* | 10/2015 | Gerweck | G06F 17/30592 707/706 |
| 2015/0310082 | A1* | 10/2015 | Han | G06F 17/30592 707/602 |
| 2015/0363167 | A1* | 12/2015 | Kaushik | G06F 7/24 707/753 |

OTHER PUBLICATIONS

SAS, SAS 9.3 Interface to Hadoop Reference, Mar. 2012, SAS, pp. 1-46.*
Patnekar et al., Data Storage and Modeling of Data Systems, 2010, ACM, pp. 1-11.*
Zhang et al., Improving performance by creating a native join-index for OLAP, 2011, Higher education press, pp. 1-14.*

* cited by examiner

OLAP QUERY PROCESSING METHOD ORIENTED TO DATABASE AND HADOOP HYBRID PLATFORM

FIELD OF THE INVENTION

The present invention relates to an on-line analytical processing (OLAP) query processing method, and more particularly to a parallel OLAP query processing method oriented to a database and Hadoop hybrid platform, which belongs to the technical field of database management.

BACKGROUND OF THE INVENTION

A design of on-line analytical processing (OLAP) aims to satisfy specific query and reporting requirements in a decision support or multi-dimensional environment. A data warehouse generally adopts a multi-dimensional model to store subject-oriented analytical datasets, and mainly adopts a star-schema storage model having multiple dimension tables and a single fact table. The core of the OLAP query is star-join, that is, on the basis of the joining of the fact table and the multiple dimension tables, group-by aggregate calculation is performed on join results. The join operation between the fact table and the dimension tables mainly adopts the hash join technology. The key of the hash join technology lies in improving the storage efficiency of a hash table and the efficiency of hash detection, and reducing the latency of the hash join. In the OLAP, optimizing a join sequence of the fact table and multiple hash tables is a key technology of improving the performance of the OLAP query processing.

The dimension table is smaller than the fact table, so in the conventional typical technology, local OLAP processing on fact table fragments is supported by adopting dimension table full copy and fact table horizontal fragmentation technologies, and global reduce is performed on local OLAP aggregate results. The technical solution, on one hand, costs a large amount of dimension table redundant copy, and on the other hand, requires high cost of synchronous overhead for the update of the dimension table in a real-time OLAP application, which is hard to satisfy the requirements of the real-time OLAP.

In order to reduce network transmission cost of parallel join operation, in some database systems, collaborative partitioning (hash or range partitioning) of join key values of a fact table and dimension tables is adopted, so that corresponding primary-foreign key values in the fact table and the dimension tables joined thereto are stored in a distributed mode according to the same partition function, and therefore, tuples of the joins of the fact table and the dimension tables are allocated on the same node in advance, thereby reducing the network transmission cost during the join operation. However, compared with the multi-dimensional data model of the data warehouse, the partitioning performed according to multiple dimensions has a very low efficiency, it is difficult to realize the collaborative distribution on the star-join structure of the fact table and the multiple dimension tables, and the dimension table partitions distributed on different nodes also face huge cost for synchronization during update.

For a small dimension table and low selectivity, generally, dynamic data distribution is implemented by performing network broadcasting on sub-tables in the dimension table satisfying a condition or hash tables. However, in the OLAP query load, the selectivity on the dimension table is relatively high, and the network cost for the broadcasting is high. On the other hand, Hadoop is a software platform capable of performing distributed processing on massive data. HDFS (Hadoop distributed file system) is a corresponding distributed file system. The Hadoop defines Map and Reduce tasks for completing sub-tasks of the OLAP query processing. During the MapReduce star-join processing procedure, massive materialized data and data distribution will occupy a large amount of disk I/O and network bandwidth, which greatly affects the overall performance.

Improving the Hadoop performance is mainly embodied in two aspects: one is improving the local data processing performance, and the other is improving the network transmission performance. The local data processing performance includes I/O performance and CPU performance during the processing. In order to improve the I/O performance during the processing of the Hadoop platform, a column store model is introduced in the Hadoop platform.

In the Chinese Patent Application No. 201010546473.3, a Hadoop-based massive stream data storage and query method and a system are disclosed. The method includes the following steps: constructing a segment-level column clustered storage structure: storing stream data as column clustered records in turn, performing compression on the column clustered records, front to back, to obtain a compressed data page, writing the compressed data page into a piece of column clustered data, and additionally writing page summary information of the compressed data page to a tail of the column clustered data, so as to obtain a complete data segment; during the procedure of executing a query statement, according to a filtering condition, constructing a scan table by using the page summary information stored at the tail of the data segment so as to perform fast filtering on the data. Seen from the essential technology of the compression algorithm, the data compression technology involved in this patent and a compression technology adopted by a column store database have no essential difference, but only have different application fields.

For the optimization technology of the I/O performance, one solution is transplanting the mature column store compression technology to the Hadoop, so as to improve the storage efficiency and performance of the Hadoop; and the other solution is introducing the column store database, as a complete storage engine, into the Hadoop system to serve as an assistant storage engine, so as to improve the I/O performance from the perspective of system integration.

The column store technology adopts an access mode of one column at a time, and the OLAP query processing needs to generate a materialized join index or join result bitmap to indicate a position of data in the join column and satisfying the join condition. The row store technology adopts an access mode of one row at a time, and the OLAP query processing generally adopts a pipeline mode to eliminate the cost of materializing data between join tables, but needs to transfer local results of the join operation between pipelines. Therefore, performing multi-dimensional query join optimization on the basis of the storage model needs to better combine the I/O performance of the column store and the query processing efficiency of the row store, so as to further improve the local data processing performance through the query optimization technology.

SUMMARY OF THE INVENTION

The objective of the present invention is to provide an OLAP query processing method oriented to a database and Hadoop hybrid platform. The method integrates the database query processing and the Hadoop query processing in a loosely-coupled mode, thereby ensuring the high query processing performance, and ensuring the high fault-tolerance performance.

According to the above objective, the present invention adopts the following technical solution.

An OLAP query processing method oriented to a database and Hadoop hybrid platform is provided, which is characterized as follows.

On the basis of a multi-copy fault-tolerance mechanism of the Hadoop, a fact table is stored in a database cluster and a Hadoop cluster, a main working copy and at least one fault-tolerant copy of the fact table are set, the main working copy is imported into a local database of a working node, and a table corresponding to the main working copy is named according to a unified naming rule; the main working copy in a Hadoop distributed file system is deleted, and meta-information of the main working copy in namenode is updated into a JDBC connection of the local database and the name of the table corresponding to the main working copy.

When OLAP query processing is performed, the processing is executed first on the main working copy, and a query processing result is recorded in an aggregate result table of the local database.

When the working node is faulty, node information of the fault-tolerant copy corresponding to the main working copy is searched for through the namenode, and a MapReduce task is invoked to complete the OLAP query processing task on the fault-tolerant copy.

Preferably, the OLAP query processing method is applied in a hybrid platform having a dual-storage engine and a dual-OLAP query processing engine, the dual-storage engine includes a database storage engine and a Hadoop storage engine, and the dual-OLAP query processing engine includes a database OLAP engine and a Hadoop query processing engine.

Preferably, a parallel OLAP query processing technology is adopted for the main working copy of the local database; and a MapReduce query processing technology is adopted for the fault-tolerant copy in the Hadoop distributed file system.

Preferably, if a node is faulty during the procedure of query processing, the database cluster completes the OLAP query processing task on some datasets, searches the namenode for a storage node of the fault-tolerant copy corresponding to the main working copy in the working node according to a number of the faulty node, and invokes the MapReduce task to complete the OLAP query processing task on the fault-tolerant copy; and an OLAP query processing result of the database cluster and an OLAP query processing result of the MapReduce task are merged.

Preferably, when the OLAP query results of the working nodes are reduced, if no node is faulty during the procedure of inserting local aggregate results to reduce nodes, after all aggregate result records are inserted to the reduce nodes, a group-by operation is executed to perform global aggregate; and aggregate result records in the reduce nodes are loaded into a designated reduce node to perform a final aggregate result reduce operation, and an OLAP query processing result is returned.

Preferably, when the OLAP query results of the working nodes are reduced, if a node is faulty during the procedure of inserting local aggregate results to reduce nodes, after the insertion work of the aggregate results of the reduce nodes is completed, the aggregate result record inserted by the faulty node is filtered out when a group-by operation is executed according to a number of the faulty node, so as to obtain an aggregate reduce result of a part of the nodes; and after the faulty node is restored or the OLAP query processing corresponding to the faulty node copy is redone by another fault-tolerant node, the aggregate result record generated on the copy influenced by the faulty node is inserted into an aggregate result table of the reduce node, and global merge is performed on aggregate result subsets of the two OLAP query processing stages by executing the group-by operation again.

Preferably, dimension tables are stored in a central node in a centralized way, and fact tables are distributed on the working nodes according to a data distribution policy of the Hadoop distributed file system, so as to form an inverse star-type storage structure with the dimension tables as a center.

Preferably, a predicate in an SQL statement is applied on the dimension table and a corresponding group-by attribute vector is selected, data in the group-by attribute vector is coded by bit, and a position corresponding to a dimension table record in a predicate vector and satisfying a predicate condition is filled with a code.

When the SQL statement is executed, a predicate operation is performed on the central node, a coded predicate vector is generated for each corresponding dimension table, stored in a primary vector cache, and synchronized to a secondary vector cache of each working node through a broadcasting mechanism, and each working node generates a local aggregate calculation result based on the coded predicate vector, in which a group-by attribute is replaced with a code.

After the global aggregate result reduce is completed, the group-by attribute code in the aggregate result is replaced with an original group-by attribute value at the central node according to a predicate result code table, and a final query processing result is returned to a user.

Preferably, when many concurrent queries and few group-by attribute updates of the dimension table exist, a query filter required by the join operation is minimized into a bitmap, and dimension table group-by attributes required by the group-by operation are cached in main memory of the working node.

The present invention has the following beneficial effects.

(1) The database technology and the Hadoop technology are combined, and the storage performance (column store) of the database and the high expandability and high availability of the Hadoop are combined by using the dual-storage engine and the dual-query processing engine.

(2) The database query processing and the Hadoop query processing are integrated in a loosely-coupled mode by using a primary-secondary copy management mechanism, thereby ensuring the high query processing performance, and ensuring the high fault-tolerance performance.

(3) The distributed cache and predicate vector technologies ensure the low network transmission delay and synchronization cost.

(4) The predicate vector technology supports the merge of a service on-line transaction processing (OLTP) system and an analytical OLAP system, and implements the real-time OLAP processing.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE PREFERRED EMBODIMENTS

Figure 1:
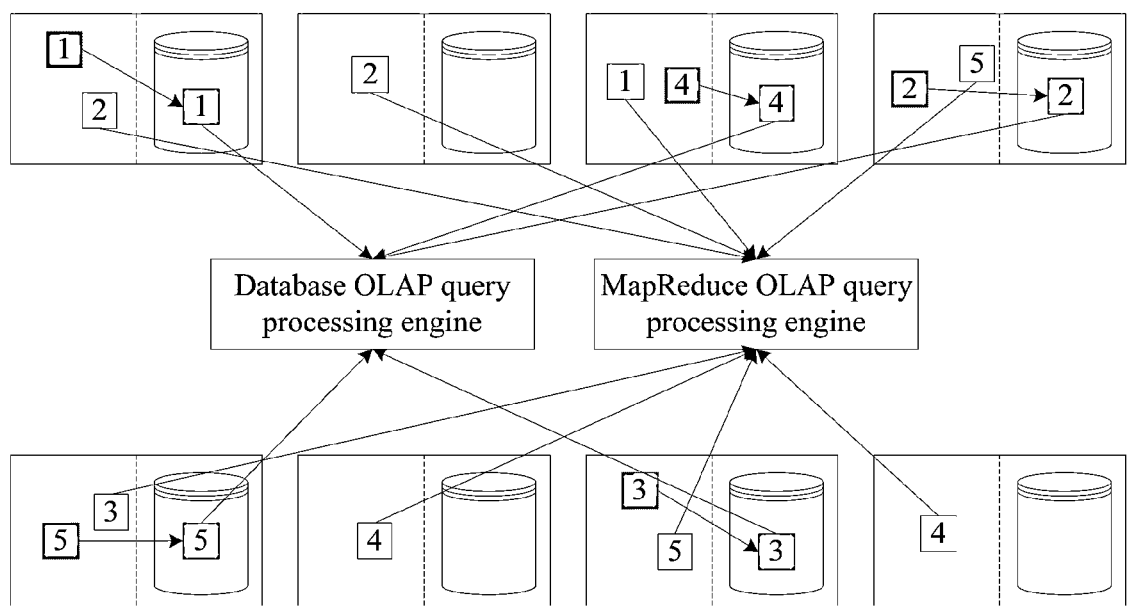
FIG. 1 is a schematic view of a basic architecture of a dual-OLAP query processing engine in the present invention.

Parallel OLAP processing includes two stages, namely, local OLAP processing and global OLAP processing, and the performance thereof depends on the performance of a local OLAP query processing engine and the network transmission performance. A key problem to be solved by the OLAP processing over a massive data warehouse is a data distribution model, a parallel OLAP query processing model and a network communication model.

Therefore, an OLAP query processing method on a database and Hadoop hybrid platform is disclosed in the present invention. The method includes technical contents such as an inverse star-schema storage model, a distributed cache technology, a DDTA-JOIN technology, a hybrid copy management technology, a hybrid OLAP query processing engine technology, and a reduce technology based on a database hash aggregate algorithm. The inverse star-schema storage model is used to implement distributed storage of a data warehouse star-schema storage model. The distributed cache technology manages a memory of a working node as a virtual shared memory through the network, so as to implement primary-secondary update propagation. The DDTA-JOIN technology is a star join processing technology characterized by a dimension table surrogate key and a predicate vector. The hybrid copy management technology is based on a 3-copy management mechanism of the HDFS system, in which one main working copy and two fault-tolerant copies are respectively stored in the database and the HDFS system through a 1+2 main-fault-tolerant copy management mechanism, thereby implementing high-performance real-time OLAP supporting and high-availability OLAP query processing. The hybrid OLAP query processing engine technology refers to that a hybrid engine of database-based parallel OLAP query processing and Hadoop-based query processing is adopted in the system. The reduce technology based on the database hash aggregate algorithm refers to using a database as a Reduce engine, that is, OLAP query result subsets of working nodes are inserted into a database table of reduce nodes, and a global aggregate result reduce task is completed by executing a group-by operation. Detailed specific illustration is made as follows.

For the OLAP query processing of disk storage, the I/O performance is the most important constraint on the OLAP query effect, and therefore, the OLAP query processing method needs to be optimized on the basis of column store, so as to obtain the most desired performance in terms of the storage engine and query processing engine.

The OLAP query processing method provided in the present invention is applied in a hybrid platform with a dual-storage engine (using a database and an HDFS to serve as the primary-secondary storage engine) and a dual-OLAP query processing engine (including a database OLAP engine and a Hadoop query processing engine), and is implemented by using the distributed cache technology. The database storage engine and the OLAP query processing engine are responsible for the high-performance OLAP query processing, and the storage engine of the Hadoop platform and OLAP query processing engine are responsible for data fault-tolerance level backup data storage and query processing. The architecture may be used as an independent database cluster and Hadoop platform to satisfy different requirements, and may be mutually merged in the data warehouse and OLAP application, thereby improving the real-time processing performance, storage efficiency, expandability, and fault-tolerance performance of the whole system.

The hybrid copy management technology in the present invention refers to that, based on the multi-copy fault-tolerance mechanism of the Hadoop platform (in the HDFS system, every data block has copies, and a default number of the copies is 3), the copies are classified as a main working copy and two fault-tolerant copies. The fact table is stored in the database cluster according to the distributed storage policy of the HDFS system, a first copy is used as the main working copy, the main working copy is imported into a local database of the working node, a table corresponding to the copy is named according to a unified naming rule, the main working copy in the HDFS system is deleted, and meta-information of the main working copy in namenode is updated to a JDBC join of the local database and the name of the table corresponding to the copy.

Specifically, the 3-copy management mechanism of the HDFS system is modified, and a plug-in database storage engine, for example, a column store engine, is deployed for the working node to improve the data storage and I/O access performance. The data is loaded into the HDFS system, and is stored by adopting a copy policy and distribution policy of the HDFS system. In an embodiment of the present invention, the 3 copies are defined as 1 main working copy and 2 fault-tolerant copies, the main working copy is loaded into a database of a node of the main working copy, the main working copy is stored as a data table by using a unified naming rule, meta-information of the main working copy is updated in the namenode of the Hadoop platform according to information of the data table, and access information of the main working copy, such as the JDBC connection description and a table name, is recorded. The main working copy in the HDFS system is deleted. After performing the data processing, the distributed database in the HDFS system saves a complete set of database structured data copies, the Hadoop platform saves two sets of unstructured copies of a file format, and the distribution of the hybrid copies complies with the fault-tolerance policy of the Hadoop platform. FIG. 1 shows a basic architecture of a dual-OLAP query processing engine in the present invention. Dark data blocks represent main working copies of file copies in the HDFS system, and the main working copies are migrated from the HDFS system to the database. The parallel OLAP query processing technology with DDTA-JOIN as a core is adopted for the main working copy of the database; and the Hadoop query processing technology is adopted for the fault-tolerant copy of the HDFS system.

In the hybrid OLAP query processing engine technology, the OLAP query processing task is first processing the main working copy of the database cluster through the DDTA-JOIN technology, and recording a query processing result in an aggregate result table of the local database. When no node is faulty during the procedure of query processing, the database cluster completes all the OLAP query processing task; and if a node is faulty during the procedure of query processing, the database cluster completes the OLAP query processing task on some datasets, searches the namenode for a storage node of the fault-tolerant copy corresponding to the main working copy in the node according to a number of the faulty node, and invokes a preset MapReduce task to complete the OLAP query processing task on the fault-tolerant copy, and an OLAP query processing result of the database cluster and an OLAP query processing result completed by the fault-tolerance level MapReduce task are merged.

Integrating the database query processing and the Hadoop query processing in the loosely-coupled mode refers to that the database and the Hadoop system are independent in terms of the storage engine and query processing engine, and can perform maintenance and system upgrading separately. The database system provides assistant storage and query processing services for the Hadoop system, high-level logical function invoking is available between the two, and it is unnecessary to perform system interface-level invoking at a data access bottom layer. When a node is faulty, the database engine proposes a fault-tolerant copy execute request to the Hadoop through copy meta-data, the Hadoop system separately completes the fault-tolerant data processing through the MapReduce task, and aggregate merge is performed on the query result on the fault-tolerant copy and the query result of the database system. Therefore, it is not required to expand functions of the database system, as many current database manufacturers do, to support the complex function upgrading of directly invoking MapReduce in the query processing engine of the database.

Figure 2:
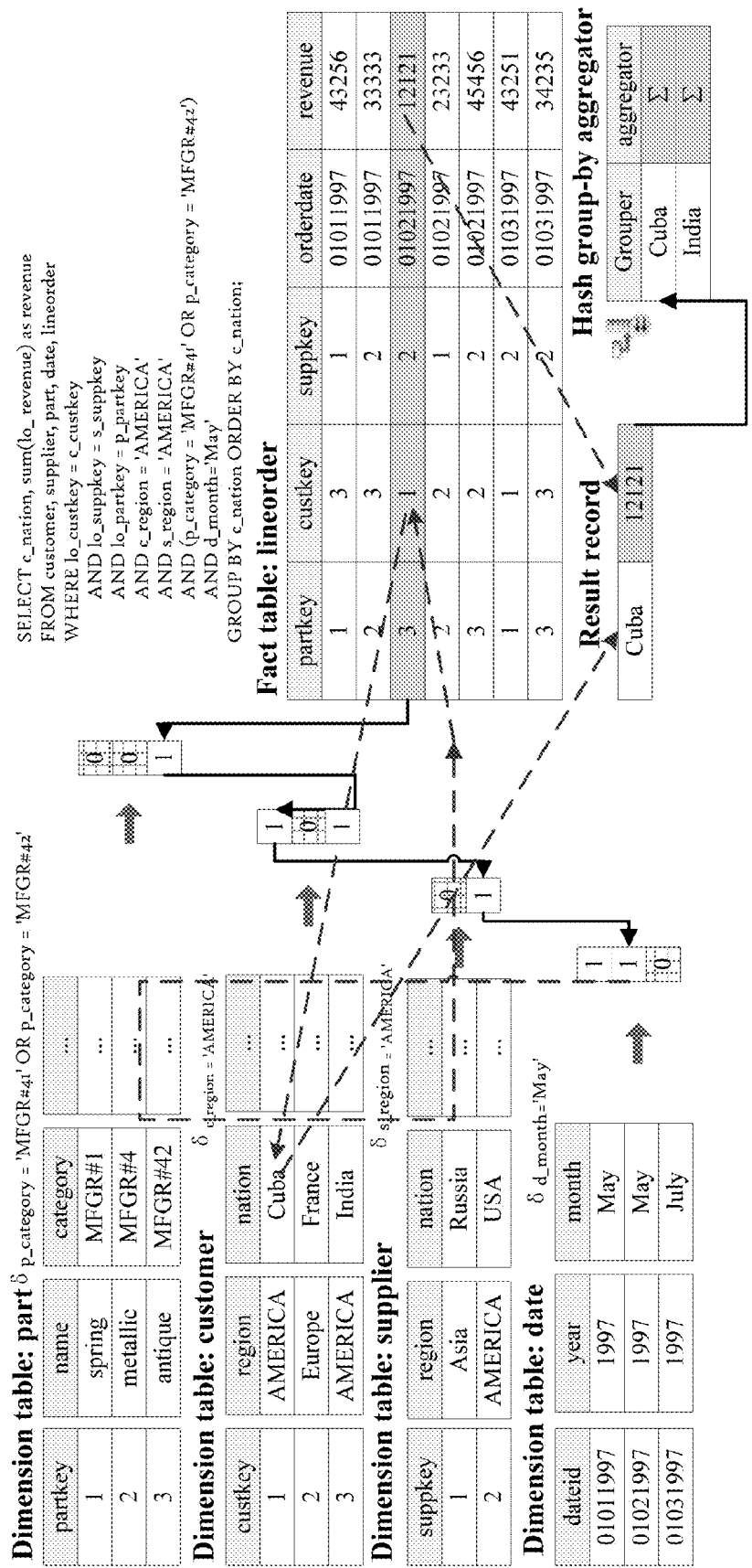
FIG. 2 is a schematic view of an OLAP query processing technology oriented to a star-schema storage model.

The DDTA-JOIN technology is an OLAP query processing technology oriented to the star-type storage model. As shown in FIG. 2, the OLAP query processing technology oriented to the star-type storage model is characterized in that, the dimension table adopts a column store model in the memory, a predicate operation is performed to generate a predicate vector for indicating a predicate result, a primary key of the dimension table uses a surrogate key to support directly mapping a key value to an offset address (array subscript address) of a memory column-stored dimensional attribute array, and when sequentially scanning the fact table, the predicate vector and dimension table group-by attribute column are directly accessed according to the dimension table record mapped to by a foreign key and the memory offset address, thereby implementing a pipeline join bitmap filtering operation of the predicate vector and a late materialization access technology for the dimension table group-by attribute in the star-join.

In the DDTA-JOIN technology, the predicate operation in the OLAP query is applied to the dimension table to generate a predicate result bitmap, which is referred to as a predicate bitmap vector. The predicate bitmap vector is used to record whether each dimension table record satisfies all predicate conditions on the dimension table (1 indicates satisfying, and 0 indicates not satisfying). The primary key of the dimension table adopts the surrogate key, that is, a naturally increasing data sequence 1, 2, 3, . . . , a dimension table group-by attribute is loaded into the memory to form a group-by attribute array, and the dimension table surrogate key can be directly mapped to a subscript of the dimensional attribute array. During the OLAP query processing, the predicate bitmap vector is used as a query filter to complete multi-table join (that is, star-join). In other words, the fact table record foreign key value is mapped to a subscript of a corresponding dimension table predicate bitmap vector, and a flag bit of each dimension table predicate bitmap vector is extracted directly to perform a bit operation (logical AND operation). The record having the bit operation result being false is ignored, and a next fact table record is scanned. When the bit operation result is true, a group-by attribute data item is directly extracted according to the dimensional attribute array subscript mapped to by the fact table foreign key value to perform subsequent hash group-by aggregate processing. The DDTA-JOIN technology supports the column store model, multi-core parallel OLAP, and multi-core concurrent OLAP query processing based on disk shared scan, and is used by a high-performance OLAP processing engine in the present invention.

In the reduce technology based on the database hash group-by aggregate algorithm provided in the present invention, hash groups in the database are used to implement the reduce operation, that is, OLAP query result subsets of working nodes are inserted into a database table of a reduce node, and the group-by operation is executed to complete a global aggregate result reduce task. When the database system needs multiple reduce nodes, an aggregate result table is created in a designated node. Each working node completes local OLAP query processing, and stores an aggregate result in a local aggregate result table, a reduce node number is allocated for a group-by record in the aggregate result table according to a hash function designated by the database system, the join with the reduce node is established through the meta-information (JDBC) of the reduce node, and the local aggregate result record with the node number attached thereto is inserted into the aggregate result table of the reduce node through an insert command.

Figure 3:
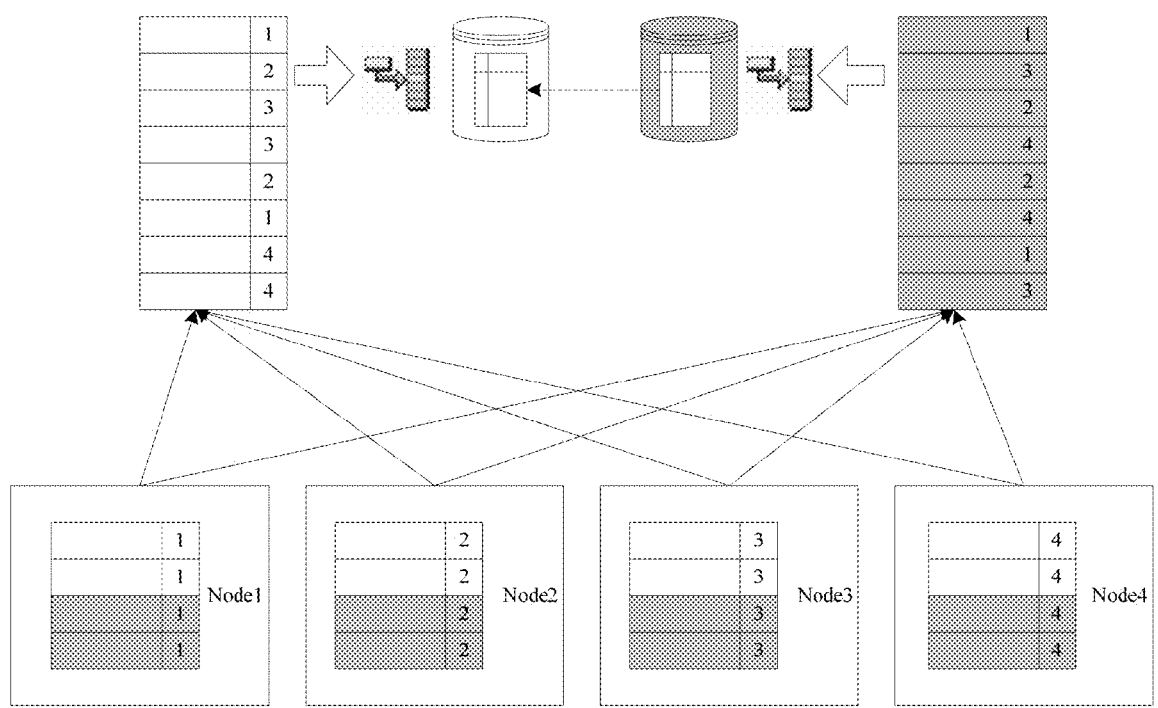
FIG. 3 is a schematic view of a reduce technology based on a database hash aggregate algorithm.

1) As shown in FIG. 3, when no node is faulty during the procedure of inserting the local aggregate results to the reduce nodes, after all the aggregate result records are inserted to the reduce nodes, the group-by operation is executed to perform global aggregate. Then, aggregate result records in the reduce nodes are loaded into a designated reduce node to perform the final aggregate result reduce operation, and the OLAP query processing result is returned.

2) When a node is faulty during the procedure of inserting the local aggregate results to the reduce nodes, after the insertion work of the aggregate results of the reduce nodes is completed, the aggregate result record inserted by the faulty node is filtered out when the group-by operation is executed according to a number of the faulty node, so as to obtain an aggregate reduce result of a part of the nodes. After the faulty node is restored or the OLAP query processing corresponding to the faulty node copy is redone by another fault-tolerant node, the aggregate result record generated on the copy influenced by the faulty node is inserted into an aggregate result table of the reduce node, and global merge is performed on aggregate result subsets of the two OLAP query processing stages by executing the group-by operation again.

If the database cluster has high reliability, a stream data-based real-time group-by aggregate reduce module may be set to not insert the aggregate result records from the working nodes into the aggregate result table, but directly import them into a group-by aggregate hash table to implement real-time aggregate processing.

When a lot of reduce nodes are required, the policy of the Hadoop platform is adopted to allocate multiple reduce nodes. When generating an aggregate result set, each working node allocates a reduce node for each aggregate result record, and inserts, through the JDBC, the aggregate result record into an aggregate result table of a designated reduce node. When all reduce nodes complete the aggregate result reduce task, the aggregate result tables of the reduce nodes are reduced to the aggregate result table of one node to complete the final aggregate result reduce operation, so as to generate the final OLAP query processing result.

In order to implement the real-time OLAP processing on massive data, data update in the real-time OLAP is embodied in the dimension table as real-time data update, including insertion, deletion, and modification. The data warehouse complies with a reference integrity constraint, so when a dimension table record is deleted, a related fact table record must be deleted first, and therefore, the deletion operation on the dimension table occurs less frequently. The deletion operation may be delayed by adding a deletion mark to the dimension table record, and the deletion operation is processed periodically in a batch processing mode. The surrogate key/primary key of the dimension table is pre-allocated by the system and does not support modification. Other dimension table attributes support a real-time modification operation. The data update in the real-time OLAP is embodied in the fact table as an addition operation. Record addition adopts the batch processing mode, and the update on the dimension table can support real-time update of the existing dimension table data.

Figure 4:
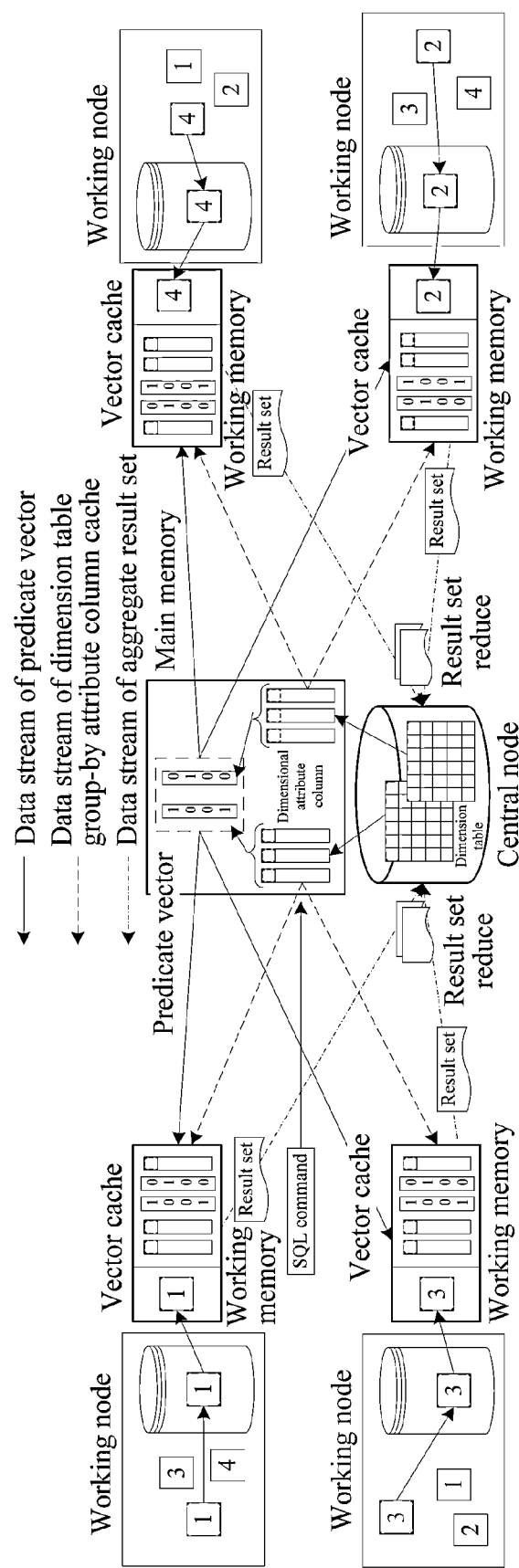
FIG. 4 is a schematic view of an inverse star-schema storage structure used in the present invention.

In the present invention, the data storage adopts an inverse star-schema storage structure as show in FIG. 4. The dimension tables having more columns but small data volume are stored in a central node (or referred to as a primary node) in a centralized way, and the fact tables having large data volume are distributed on working nodes according to the data distribution policy of the HDFS system, so as to form the inverse star-schema storage structure with the dimension tables as the center (contrary to the structure in the star-schema storage model with the fact table as a center). The inverse star-schema storage structure is especially suitable for supporting the real-time update operation.

In addition, the present invention adopts a primary-secondary vector cache design, so as to synchronize the predicate vector and the dimension table group-by attribute vector between the central node and the working node. In the vector cache design, the following two cache technologies can be used.

1) Coded Predicate Vector Cache Technology

Figure 5:
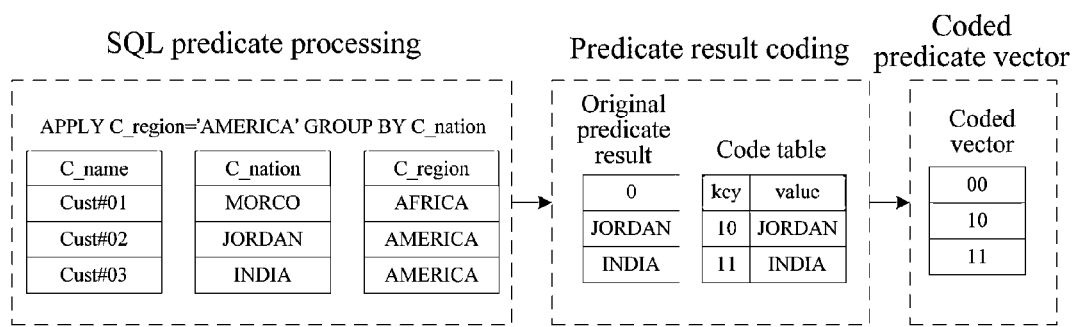
FIG. 5 is a schematic view of a coded predicate vector cache technology used in the present invention.

As shown in FIG. 5, a predicate in an SQL statement is applied on the dimension table and a corresponding group-by attribute vector is selected, then, data in the group-by attribute vector is coded by bit, and a position corresponding to a dimension table tuple in the predicate vector and satisfying a predicate condition is filled with a code. For example, 00 indicates that a dimension table record 1 does not satisfy the predicate condition, 10 indicates that a dimension table tuple 2 satisfies the predicate condition, and a code of the corresponding group-by attribute c_nation is 10, and so on. When the SQL statement is executed, it is required to perform the predicate operation on the central node, and a coded predicate vector is generated for each corresponding dimension table, stored in a primary vector cache, and then synchronized to a secondary vector cache of each working node through a broadcasting mechanism. Each working node, based on the coded predicate vector, adopts the DDTA-JOIN technology to generate a local aggregate calculation result, where the group-by attribute is replaced with a code. After the global aggregate result reduce is completed, in the central node, the group-by attribute code in the aggregate result is replaced with an original group-by attribute value according to the predicate result code table, and a final query processing result is returned to the user. In this vector cache technology, the predicate vector is query private data that cannot be shared, and therefore, before the query is executed, broadcasting update needs to be performed according to a coded predicate vector generated by new query.

2) Dimension Table Group-by Attribute Cache Technology

When many concurrent queries and few group-by attribute updates of the dimension table exist, the dimension table group-by attribute cache technology is adopted to minimize a query filtering operation required by the join operation to a bitmap operation, and the dimension table group-by attribute required by the group-by operation is cached in main memory of the working node to improve the shared access capability.

Figure 6:
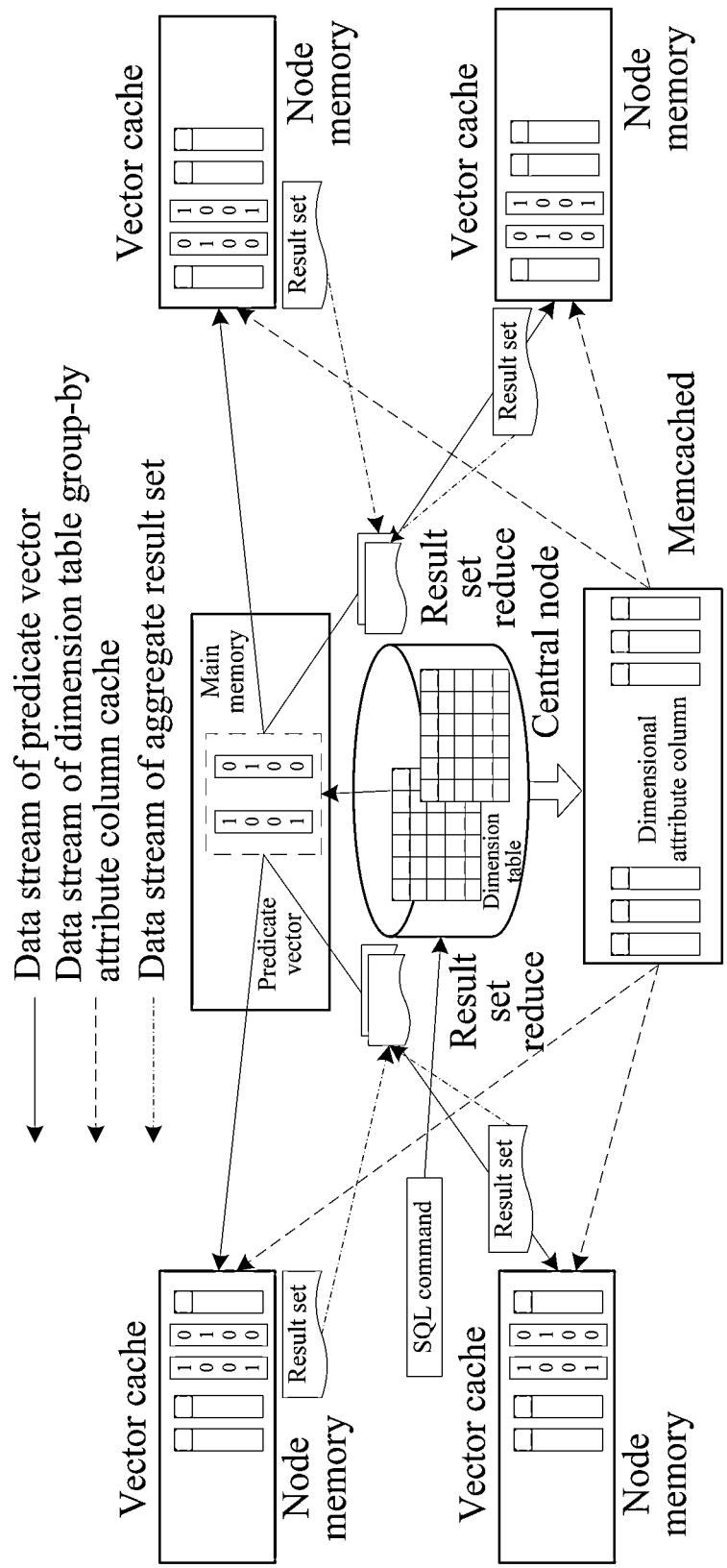
FIG. 6 is a schematic view of a distributed cache technology used in the present invention.

During specific implementation, the distributed cache technology as shown in FIG. 6 may be adopted. The distributed cache technology refers to updating shared access data generated by the primary node to the distributed cache. The distributed cache is constituted by memories of working nodes in the database cluster. If the cached data has large data volume and less change, the data can be materialized to a local disk to form a three-level storage mode of primary cache-secondary cache-local disk cache. The predicate vector, as the query filtering operation, needs to be generated in real time when executing the query and then broadcasted to each working node. The dimension table group-by attribute has a public access characteristic, and therefore, the dimension table group-by attribute accessed in the query is cached in the distributed cache of the database system. In FIG. 6, a multi-level storage structure is adopted, namely, a memory dimension table attribute column of the central node→a shared cache (such as a Memcached distributed cache technology [http://memcached.org/])→a working node memory→a working node disk. In this storage policy, the dimension table group-by attribute adopts an incremental cache mode, and is cached in Memcached (a distributed memory object cache system, used for a dynamic Web application to reduce the database load) as a memory dimensional attribute vector. When executing the local OLAP processing, the working node may directly access the dimensional attribute vector cached in the Memcached, and the dimensional attribute vector cached in the Memcached may also be cached in the memory of the local working node, for being accessed in the local OLAP query processing.

When the memory space is insufficient, the dimensional attribute vector may be materialized in the local disk, and then exchanged between the memory and the disk according to access requirements. When the dimension table group-by attribute is updated, the group-by attribute in the working node cache may be synchronized through the distributed cache. If the memory capacity is insufficient to accommodate all dimension table tuples, dimension table memorization may be performed according to the following priority: group-by attributes→predicate operation attributes→all dimensional attributes. The dimensional attributes can adopt the data compression technology when being stored in the memory column to further reduce the memory consumption. The group-by attributes and the predicate operation attributes may be loaded in an incremental mode during the query processing, and dimensional attribute columns having low access frequency are eliminated in the memory dimensional attribute management according to a Least Recently Used (LRU) policy, so as to accommodate new dimensional attribute columns.

Figure 7:
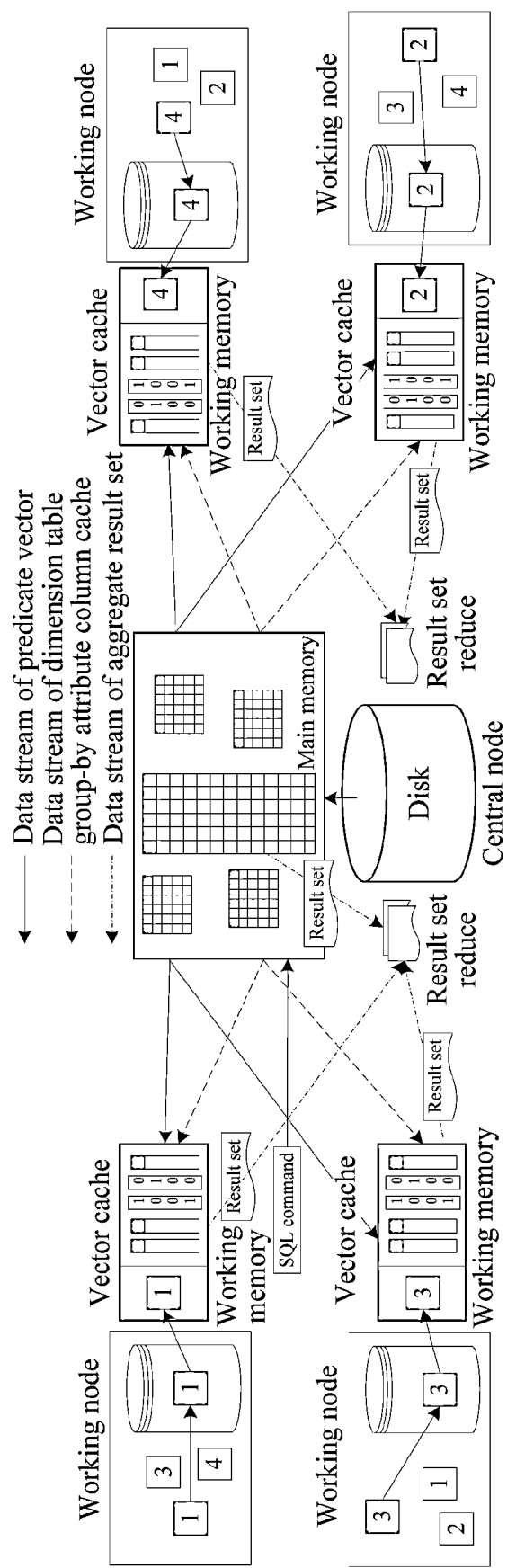
FIG. 7 is a schematic view of an OLTP and Hadoop OLAP hybrid model.

In order to further satisfy the requirement of the real-time OLAP query processing, a front-end service OLTP system and a Hadoop-based OLAP system may be merged into a unified OLAP analytical platform. As shown in FIG. 7, the OLTP system is deployed on the central node, and a high-performance main memory database or disk resident database system may be adopted. Fact table data in the OLTP system is periodically loaded into the Hadoop OLAP system in batches, and the OLTP system stores real-time updated data. The Hadoop OLAP system and the OLTP system share the same set of dimension table storage, and the dimension table in the OLTP system supports the real-time update. When executing the OLAP query processing, the Hadoop OLAP system first generates a predicate vector in the OLTP system, broadcasts the predicate vector to a Hadoop database cluster through a primary-secondary cache to perform parallel OLAP processing, at the same time, performs the OLAP processing on latest data of the OLTP system in a centralized way, reduces OLAP aggregate calculation results of the OLTP system and the Hadoop OLAP system, and returns to the user an OLAP query processing result on real-time data.

The present invention is not limited by the specifically adopted database technology and Hadoop version, and is a loosely-coupled system-level integration technology. By using the primary-secondary copy management mechanism, the database query processing and the MapReduce query processing are integrated in the loosely-coupled mode, thereby ensuring high query processing performance, and ensuring high fault-tolerance performance.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An on-line analytical processing (OLAP) query processing method oriented to a database and Hadoop hybrid platform, based on an inverse star-schema storage structure with dimension tables stored in a central node in a centralized way, and fact tables distributed on working nodes according to a data distribution policy of a Hadoop distributed file system, wherein:
   storing a fact table in a database cluster based on a multi-copy fault-tolerance mechanism of the Hadoop distributed file system;
   setting a main working copy and at least one fault-tolerant copy of the fact table;
   importing the main working copy into a local database of a working node;
   naming a table corresponding to the main working copy according to a unified naming rule;
   deleting the main working copy in the Hadoop distributed file system;
   updating meta-information of the main working copy in a namenode into a JDBC connection of the local database and a name of the table corresponding to the main working copy;
   executing OLAP query processing first on the main working copy through a DDTA-JOIN in which a predicate bitmap vector is used as a query filter to complete multi-table join, a fact table record foreign key value is mapped to a subscript of a corresponding dimension table predicate bitmap vector, a flag bit of each dimension table predicate bitmap vector is extracted to perform a bit operation, and a group-by attribute data item is extracted according to a dimensional attribute array subscript mapped to by the fact table foreign key value to perform a hash group-by aggregate processing when a result of the bit operation is true, and recording a query processing result in an aggregate result table of the local database;
   completing the OLAP query processing on some datasets, searching the namenode for a storage node of the at least one fault-tolerant copy corresponding to the main working copy in the working node according to a number of the faulty nodes, and invoking a MapReduce task to complete the OLAP query processing on the at least one fault-tolerant copy by the database cluster, when the working node is faulty during a procedure of the OLAP query processing;
   merging an OLAP query processing result of the database cluster and an OLAP query processing result of the MapReduce task; and
   returning a merged OLAP query processing result.

2. The OLAP query processing method oriented to a database and Hadoop hybrid platform according to claim 1, wherein:
   the OLAP query processing method is applied in a hybrid platform having a dual-storage engine and a dual-OLAP query processing engine, the dual-storage engine comprises a database storage engine and a Hadoop storage engine, and the dual-OLAP query processing engine comprises a database OLAP engine and a MapReduce query processing engine.

3. The OLAP query processing method oriented to a database and Hadoop hybrid platform according to claim 1, wherein:
   a parallel OLAP query processing technology with DDTA-JOIN is adopted for the main working copy of the local database; and a MapReduce query processing technology is adopted for the at least one fault-tolerant copy in the Hadoop distributed file system.

4. The OLAP query processing method oriented to a database and Hadoop hybrid platform according to claim 1, wherein:
   when the OLAP query results of the working nodes are reduced, if no node is faulty during a procedure of inserting local aggregate results to reduce nodes, after all aggregate result records are inserted to the reduce nodes, a group-by operation is executed to perform global aggregate; and aggregate result records in the reduce nodes are loaded into a designated reduce node to perform a final aggregate result reduce operation, and an OLAP query processing result is returned.

5. The OLAP query processing method oriented to a database and Hadoop hybrid platform according to claim 1, wherein:
   when the OLAP query results of the working nodes are reduced, if a node is faulty during a procedure of inserting local aggregate results to reduce nodes, after the procedure of inserting local aggregate results to reduce nodes is completed, the aggregate result record inserted by the number of faulty nodes is filtered out when a group-by operation is executed according to the number of the faulty nodes, so as to obtain an aggregate reduce result of a part of the working nodes; and after the number of faulty nodes are restored or the OLAP query processing corresponding to a faulty node copy is redone by another fault-tolerant node, the aggregate result record generated on the faulty node copy influenced by the faulty node is inserted into an aggregate result table of the reduce node, and global merge is performed on aggregate result subsets of the OLAP query processing by executing the group-by operation again.

6. The OLAP query processing method oriented to a database and Hadoop hybrid platform according to claim 1, wherein:

when many concurrent queries and few group-by attribute updates of the dimension table exist, a query filter required by a join operation is minimized into a bitmap, and a dimension table group-by attribute required by the group-by operation is cached in a cache of the working node.

7. The OLAP query processing method oriented to a database and Hadoop hybrid platform according to claim 1, wherein:

an on-line transaction processing (OLTP) system is deployed on the central node, fact table data in the OLTP system is periodically loaded into a Hadoop OLAP system, and the OLTP system stores real-time updated data; when executing the OLAP query processing, the Hadoop OLAP system first generates a predicate vector in the OLTP system, broadcasts the predicate vector to a Hadoop database cluster through a primary-secondary cache to perform parallel OLAP processing, at the same time, performs the OLAP processing on latest data of the OLTP system in a centralized way, reduces OLAP aggregate calculation results of the OLTP system and the Hadoop OLAP system, and returns to a user an OLAP query processing result on the real-time updated data.

\* \* \* \* \*